United States Patent [19]
Pittenger et al.

[11] Patent Number: 5,541,925
[45] Date of Patent: Jul. 30, 1996

[54] POINT OF SALE SYSTEM THAT BYPASSES THE PUBLIC TELEPHONE NETWORK

[75] Inventors: Paul Pittenger, San Mateo, Calif.; John Hall, Columbus, Ohio

[73] Assignee: CompuServe Incorporated, Columbus, Ohio

[21] Appl. No.: 410,709

[22] Filed: Mar. 27, 1995

[51] Int. Cl.$^6$ ............................ H04B 7/24; H04L 12/12; H04L 12/56
[52] U.S. Cl. .................. 370/94.1; 370/95.1; 379/58; 395/200.09
[58] Field of Search ................ 370/60, 60.1, 94.1, 370/94.2, 61, 85.1, 85.2, 85.3, 85.4, 85.5, 95.1, 95.3; 395/200.09; 379/58, 90, 91, 93

[56] References Cited

U.S. PATENT DOCUMENTS

| | | | |
|---|---|---|---|
| 3,624,608 | 11/1971 | Altman et al. | 340/149 A |
| 3,752,904 | 9/1973 | Waterbury | 178/5.1 |
| 3,798,602 | 3/1974 | Hynes, Jr. | 340/149 A |
| 3,896,266 | 7/1975 | Waterbury | 179/1 SB |
| 4,763,191 | 8/1988 | Gordon et al. | 358/86 |
| 4,829,569 | 5/1989 | Seth-Smith et al. | 380/10 |
| 5,007,084 | 4/1991 | Materna et al. | 380/24 |
| 5,144,649 | 9/1992 | Zicker et al. | 379/59 |
| 5,228,053 | 7/1993 | Miller et al. | 375/1 |
| 5,265,033 | 11/1993 | Vajk et al. | 370/61 |
| 5,280,625 | 1/1994 | Howarter et al. | 395/200.09 |
| 5,444,763 | 8/1995 | Lazaridis et al. | 379/58 |

*Primary Examiner*—Wellington Chin
*Attorney, Agent, or Firm*—Standley & Gilcrest

[57] ABSTRACT

A system for communication between a POS terminal and a destination host, which may be a credit transaction authorization entity. The system includes a POS terminal, RF network port, a packet switched network, a destination node, and a destination host. The system eliminates dependence on the public telephone network by using a radio frequency link rather than the public telephone network to access the packet switched network. The originating node assembles a Data packet, which include all necessary transaction data, prior to sending a Call Request packet to the destination node, thus eliminating handshake steps and reducing the duration of packet switched network use.

4 Claims, 1 Drawing Sheet

POINT OF SALE SYSTEM THAT BYPASSES THE PUBLIC TELEPHONE NETWORK

FIELD OF THE INVENTION

The present invention relates generally to a point of sale system for effecting remote transactions using a network. In particular, the present invention is a point of sale transaction system which completely bypasses the public telephone network in effecting the transaction. Because of this bypass, there is a reduction in the number of network messages involved in completing the transaction, resulting in savings in time and money.

BACKGROUND OF THE INVENTION

Point of sale ("POS") transactions result in billions of dollars in sales of goods and services each year. The best example of the recent proliferation of consumer POS systems is the automatic debit machines in use, for example, at most large supermarkets. Using these machines, a consumer can credit the sales amount to the supermarket by directly accessing his or her bank account. Numerous systems for validating and effecting credit card transactions have also been available for years. These systems require communication between the POS terminal and some destination host which is in possession of the necessary credit information.

When conventional networks are used for a POS transaction, the steps performed in effecting the transaction are as follows. First, the originating POS terminal dials a port on a public telephone network ("PTN"), thus accessing the originating node in a packet switched network ("PSN"). The originating POS terminal then provides a mnemonic destination network address to the originating node. The originating node then converts the mnemonic address to a network called address and sends a Call Request packet to the PSN controller. The Call Request packet contains the network called address of the destination node and host. The PSN controller then sends the Call Request packet to the destination host.

If the Call Request packet is valid, the destination host replies with a Call Accepted packet. The Call Accepted packet is sent to the originating node. This is converted to a connected message and sent to the POS terminal. When the POS terminal receives the message, it sends transaction data to the originating node which compiles it into a Data packet which it sends to the destination host. The destination host processes the Data packet, assembles its own Data packet based on the information in the received Data packet and in its own database, and sends this Data packet to the originating node which sends the information portion to the POS terminal. The POS terminal, on reception of the information, disconnects from the PTN and the PSN sends a Clear Request to the destination host. A Clear Accepted message is then sent from the destination host to the originating node, and the transaction is complete.

This procedure involves many messages sent on both the PTN and the PSN. Eliminating dependence on the PTN would speed up the process and cut down on transaction costs. Delaying the Call Request until the POS has supplied the originating node with all the transaction data would reduce the duration of PSN use.

Several known systems communicate over networks other than a PTN. For example, U.S. Pat. No. 5,228,053 to Miller et al. discloses a spread spectrum cellular overlay code division multiple access ("CDMA") communications system. This system uses microwave energy to communicate between personal communications units linked in a personal communications network ("PCN"), although operational details of the microwave network are not disclosed. The system is directed toward use with cellular mobile communications subscribers. The use of a PCN in such a system would probable be impractical in a POS system intended for widespread use.

U.S. Pat. No. 5,144,649 to Zicker et al. discloses a cellular radiotelephone credit card paystation method. This method allows for communication among multiple cellular credit card paystations and a central credit card host and a remote programming host. All these components operate within an RF system and encompass a proprietary paystation and protocol. Local verification of a user's credit card enables the user to communicate using a cellular telephone. A fraud alert threshold is reached when the telephone usage exceeds a preset amount of time. The user's credit card is then remotely validated to allow further communication from the paystation. The paystation cannot, however, be used to effect a consumer transaction, and therefore cannot be used as a point of sale terminal.

U.S. Pat. No. 4,829,569 to Seth-Smith et al. discloses the communication of individual messages to subscribers in a subscription television system. This involves the selective and secure transmission of messages to individual subscribers within a broadcast system. Some of the information is transmitted in addressed packets. The system processing billing information, but this information is only pertinent to the use of the system itself. It is not used as a point of sale system, nor is this use suggested.

U.S. Pat. No. 4,763,191 to Gordon et al. discloses dial-up telephone network equipment for requesting an identified selection. This invention is a means for providing the calling party phone number to dialed party equipment so that the dialed party can correctly respond to and account for requests from the calling party. In particular, dial-a-view requests are conveyed and authorized then sent from the caller's phone to the caller's addressable television decoder. Gordon et al. use the calling party's number for routing efficiency but do not address call duration. The Gordon et al. invention uses a centralized network, but does not bypass normal the telephone network.

U.S. Pat. No. 3,798,602 to Hynes, Jr. discloses a credit authorization system. The system provides credit card verification, usage information, and user identification to a central processor which in turn can reply with access control. Hynes, Jr. does not disclose communication between a central node and an authentication host. The central processor of the Hynes, Jr. system must therefore have all access control information.

U.S. Pat. No. 3,624,608 to Altman et al. discloses a system for the rental of cars by credit card. Credit card data are read at the car and are transmitted via RF to a central location for determination of authorization. The system uses the PTN to verify credit with another credit authority.

None of the above systems is a POS system that completely eliminates use of the PTN. Further, none of the systems assembles all transaction data prior to connection with a PSN in order to curtail PSN use. A system which could accomplish both of these would cut down considerably on transaction costs.

SUMMARY OF THE INVENTION

It is therefore an object of the present invention to provide a POS system which eliminates dependence on the PTN in order to speed the transaction process and cut down on transaction costs.

It is a further object of the present invention to provide a POS system which delays the Call Request signal until the POS terminal has supplied the originating node with all the transaction data in order to reduce the duration of PSN use.

These and other objects and advantages of the present invention will be apparent to those of ordinary skill in the art upon inspection of the detailed description, drawings, and appended claims.

The present invention is a system for communication between a POS terminal and a destination host, which may be a credit transaction authorization entity. The present invention eliminates dependence on the PTN by using an RF link rather than a PTN to access the PSN. Thus, a call request and point of sale transaction information are sent to the PSN via the RF link. The originating node at the RF link assembles a POS Data packet, which includes all transaction data, prior to sending a Call Request packet to the destination node, thus eliminating handshake steps and reducing the duration of PSN use.

DETAILED DESCRIPTION OF THE INVENTION

Figure 1:
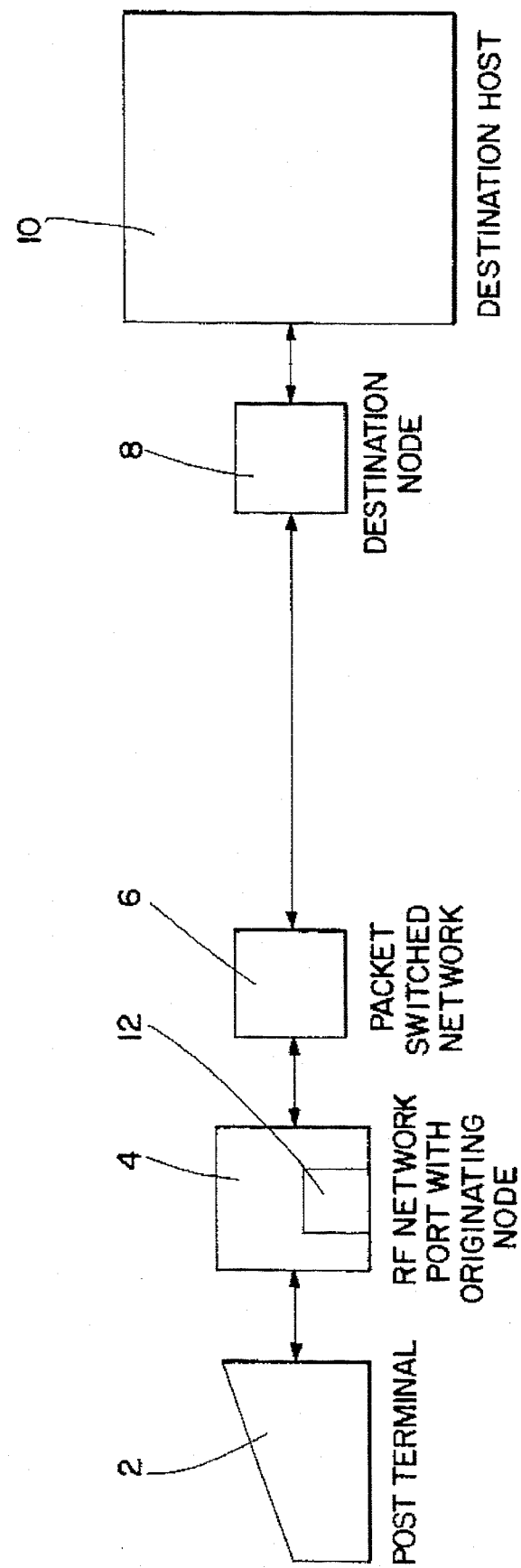
FIG. 1 shows a block diagram of the system of the present invention.

Referring to FIG. 1, a block diagram of the system of the present invention is shown. Transactions originate at the POS terminal 2. The POS terminal 2 is connected for communication with an RF network port 4 or other RF link means. The RF network delivers data from the POS terminal 2 to the PSN 6 or other network means. The PSN 6 is adapted to receive signals from the RF network port 4 and is also connected for communication with the destination node 8, which will ultimately receive the POS terminal data. The destination host 10 is connected for communication with the destination node 8 for reception and processing of the data.

The steps performed in utilizing the system of the present invention are as follows. First, the origin POS terminal 2 enables an RF network port 4 and provides POS transaction data at the appropriate time. The originating node 12 at this port 4 builds the components of a POS transaction Protocol Data Unit ("PDU"), which includes a Call Request packet having a destination called address for information derived from the transaction information, and a POS Data packet comprising the transaction information itself. Once these components have been assembled, the originating node 12 at the RF network port 4 sends the Call Request packet over the PSN 6 to the destination node 8 which relays the Call Request packet to the destination host 10. If the Call Request packet is valid, the destination host 10 replies with a Call Accepted packet.

The Call Accepted packet is sent to the originating node 12 at the RF network port 4 via the destination node and the PSN. In response, the originating node 12 next sends the transaction POS Data packet to the destination host 10 via the PSN and the destination node. The destination host 10 processes the POS Data packet, assembles its own destination Data packet based on the information in the received POS Data packet and in its own database. The destination host 10 then sends this destination Data packet to the originating node 12 of the RF network port 4, which sends the information portion of the destination Data packet to the POS terminal 2. The POS terminal 2, on reception of this information, disconnects from the RF network port 4 and the originating node 12 sends a Clear Request signal to the destination host 10. A Clear Accepted message is then sent from the destination host 10 to the originating node 12 at the RF network port 4, and the transaction is complete.

Using an RF link rather than a PTN to access the PSN saves time and money on each transaction. Reducing the duration of calls over the PSN through the use of a Call Request packet and assembled Data packets reduces resource expenditure. Over the course of a great number of transactions that are made each day, substantial savings are possible using the system of the present invention.

The includes a controller or other program means. The controller generates the Call Request packet and the POS Data packet based on the POS transaction data received at the originating node.

Preferred and alternate embodiments of the present invention have now been described in detail. It is to be noted, however, that this description of these particular embodiments is merely illustrative of the principles underlying the inventive concept. It is therefore contemplated that various modifications of the disclosed embodiments will, without departing from the spirit and scope of the present invention, be apparent to persons of ordinary skill in the art.

What is claimed is:

1. A point of sale system, comprising:
    A) a point of sale terminal for handling point of sale data;
    B) a radio frequency link, connected for communication with the point of sale terminal;
    C) a packet switched network, adapted to receive signals from the radio frequency link;
    D) an originating node for generating a call request packet and a point of sale data packet having destination called address information derived from the point of sale data;
    E) a destination node, connected for communication with the packet switched network; and
    F) a destination host, connected for communication with the destination node.

2. The point of sale system of claim 1, wherein the originating node is further adapted to send a point of sale data packet to the packet switched network in response to the reception of a call accepted packet from the packet switched network.

3. The point of sale system of claim 1 wherein the radio frequency link is a radio frequency network.

4. A process for performing a point of sale transaction from a point of sale terminal, through a radio frequency network link, to an originating node, comprising:
    A) receiving via the radio frequency network a first call request packet and a first point of sale data packet from the point of sale terminal;
    B) sending a second call request packet to the packet switched network, the second call request packet containing destination called address information derived from the first point of sale data packet;
    C) receiving via the packet switched network a call accepted packet from a destination host with the destination called address;
    D) sending a second point of sale data packet to the destination host via the packet switched network, the second point of sale data packet containing information derived from the first point of sale data packet;
    E) receiving via the packet switched network a first destination data packet from the destination host with the destination called address; and
    F) sending via the radio frequency network a second destination data packet to the point of sale terminal, the second destination data packet containing a portion of data from the first destination packet.

* * * * *